US009483639B2

(12) United States Patent
Sliwa et al.

(10) Patent No.: US 9,483,639 B2
(45) Date of Patent: Nov. 1, 2016

(54) SERVICE PARTITION VIRTUALIZATION SYSTEM AND METHOD HAVING A SECURE APPLICATION

(71) Applicants: Robert J Sliwa, Malvern, PA (US); Brittney Burchett, Malvern, PA (US); Michael J DiDomenico, Malven, PA (US)

(72) Inventors: Robert J Sliwa, Malvern, PA (US); Brittney Burchett, Malvern, PA (US); Michael J DiDomenico, Malven, PA (US)

(73) Assignee: Unisys Corporation, Blue Bell, PA (US)

( * ) Notice: Subject to any disclaimer, the term of this patent is extended or adjusted under 35 U.S.C. 154(b) by 20 days.

(21) Appl. No.: 14/517,038

(22) Filed: Oct. 17, 2014

(65) Prior Publication Data

US 2015/0261560 A1  Sep. 17, 2015

Related U.S. Application Data (60) Provisional application No. 61/952,244, filed on Mar. 13, 2014.

(51) Int. Cl.
| | | |
|---|---|---|
| *G06F 9/455* | (2006.01) | |
| *G06F 15/167* | (2006.01) | |
| *G06F 21/53* | (2013.01) | |
| *G06F 9/50* | (2006.01) | |
| *G06F 21/64* | (2013.01) | |

(52) U.S. Cl.
CPC ............ *G06F 21/53* (2013.01); *G06F 9/5077* (2013.01); *G06F 21/64* (2013.01); *G06F 2009/45583* (2013.01); *G06F 2009/45587* (2013.01); *G06F 2221/034* (2013.01)

(58) Field of Classification Search
CPC ............ G06F 9/45558; G06F 9/5077; G06F 9/45533; G06F 21/53; G06F 2009/45587
See application file for complete search history.

(56) References Cited

U.S. PATENT DOCUMENTS

| | | | |
|---|---|---|---|
| 8,677,358 B2* | 3/2014 | Evans ................. | G06F 9/45541 718/1 |
| 8,832,686 B2* | 9/2014 | Smith .................... | G06F 9/445 718/1 |
| 8,849,941 B2* | 9/2014 | Alladi .................... | G06F 9/544 709/203 |
| 9,146,760 B2* | 9/2015 | Powell ................ | G06F 9/45533 |

(Continued)

OTHER PUBLICATIONS

T. Palomino, Reliable management of dual-boot labs using radmind, Oct. 2010, 3 pages.*

(Continued)

*Primary Examiner* — Thuy Dao
(74) *Attorney, Agent, or Firm* — Robert P. Marley; Richard J. Gregson (57) ABSTRACT

A secure application system and method for a host computing device. The system includes an ultraboot application divides the host computing device into a resource management partition, at least one virtual service partition and at least one virtual guest partition. The virtual service partition provides a virtualization environment for the basic operations of the virtualization system. The virtual service partition is an isolated secure partition having a secure application executing therein. The isolated secure partition includes a security manifest portion for controlling the execution of the secure application within the isolated secure partition, and a secure application operating system (OS) portion that supports only the execution of the secure application within the isolated secure partition. The secure application is executed within the isolated secure partition without the need for any standard operating system (OS).

26 Claims, 8 Drawing Sheets

(56) References Cited

U.S. PATENT DOCUMENTS 9,311,483 B2 * 4/2016 Kurien ................. G06F 9/5077
2007/0028244 A1 * 2/2007 Landis ................. G06F 9/5016
  718/108
2015/0261559 A1 * 9/2015 Sliwa ................. G06F 9/45558
  718/1
2016/0077884 A1 * 3/2016 Hunter ................. G06F 9/5077
  718/104

OTHER PUBLICATIONS

Somani et al., VMBooter: A Specialized Virtual Machine Boot Server in an Infrastructure Cloud, Oct. 2014, 8 pages.*
Mittal et al., Efficient virtualization on embedded power architecture® platforms, Mar. 2013, 13 pages.*

* cited by examiner

SERVICE PARTITION VIRTUALIZATION SYSTEM AND METHOD HAVING A SECURE APPLICATION

CROSS-REFERENCE TO RELATED APPLICATIONS

This application claims priority to U.S. Patent Application Ser. No. 61/952,244, filed Mar. 13, 2014, which is incorporated by reference in its entirety.

Secure application system and method for a host computing device having at least one host processor and system resources including memory divided into most privileged system memory and less privileged user memory. The secure application system includes an ultraboot application that operates in the less privileged user memory and divides the host computing device into a resource management partition, with at least one virtual service partition and at least one virtual guest partition. The virtual guest partition provides a virtualization environment for at least one guest operating system. The virtual service partition provides a virtualization environment for the basic operations of the virtualization system. The resource management virtual service partition maintains a resource database for use in managing the system resources. The at least one virtual service partition is an isolated secure partition having a secure application executing therein. The isolated secure partition includes a security manifest portion for controlling the execution of the secure application within the isolated secure partition. The isolated secure partition also includes a secure application operating system (OS) portion that supports only the execution of the secure application within the isolated secure partition. The secure application operating system (OS) portion includes a secure application runtime portion that provides the runtime needed to execute the secure application within the isolated secure partition. For every virtual partition, a dedicated monitor operates in the most privileged system memory. The monitor maintains guest applications in the virtual guest partition within memory space allocated by the single virtual service partition to the virtual guest partition. The system also includes a context switch between the monitor and the respective virtual guest partitions and the single virtual service partition. The context switch controls multitask processing in the partitions on the host processor.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for providing a securely partitioned virtualization system having dedicated physical resources for each partition. In some such examples, a correspondence between the physical resources available and the resources exposed to the virtualized software allows for control of particular features, such as recovery from errors, as well as minimization of overhead by minimizing the set of resources required to be tracked in memory when control of particular physical (native) resources "change hands" between virtualized software.

Those skilled in the art will appreciate that the virtualization design of the invention minimizes the impact of hardware or software failure anywhere in the system on other partitions, while also allowing for improved performance by permitting the hardware to be directly assigned in certain circumstances, in particular, by recognizing a correspondence between hardware and virtualized resources. These and other performance aspects of the system of the invention will be appreciated by those skilled in the art from the following detailed description of the invention.

By way of reference, non-native software, otherwise referred to herein as "virtualized software" or a "virtualized system", refers to software not natively executable on a particular hardware system, for example, due to it being written for execution by a different type of microprocessor configured to execute a different native instruction set. In some of the examples discussed herein, the native software set can be the x86-32, x86-64, or IA64 instruction set from Intel Corporation of Sunnyvale, Calif., while the non-native or virtualized system might be compiled for execution on an OS2200 system from Unisys Corporation of Blue Bell, Pa. However, it is understood that the principles of the present disclosure are not thereby limited.

In general, and as further discussed below, the present disclosure provides virtualization infrastructure that allows multiple virtual guest partitions to run within a corresponding set of host hardware partitions. By judicious use of correspondence between hardware and software resources, it is recognized that the present disclosure allows for improved performance and reliability by dedicating hardware resources to that particular partition. When a partition requires service (e.g., in the event of an interrupt or other issues which indicate a requirement of service by virtualization software), overhead during context switching is largely avoided, since resources are not used by multiple partitions. When the partition fails, those resources associated with a partition may identify the system state of the partition to allow for recovery. Also, the entire platform will not be taken down if a single guest fails. Furthermore, due to a distributed architecture of the virtualization software as described herein, continuous operation of virtualized software can be accomplished.

Figure 1:
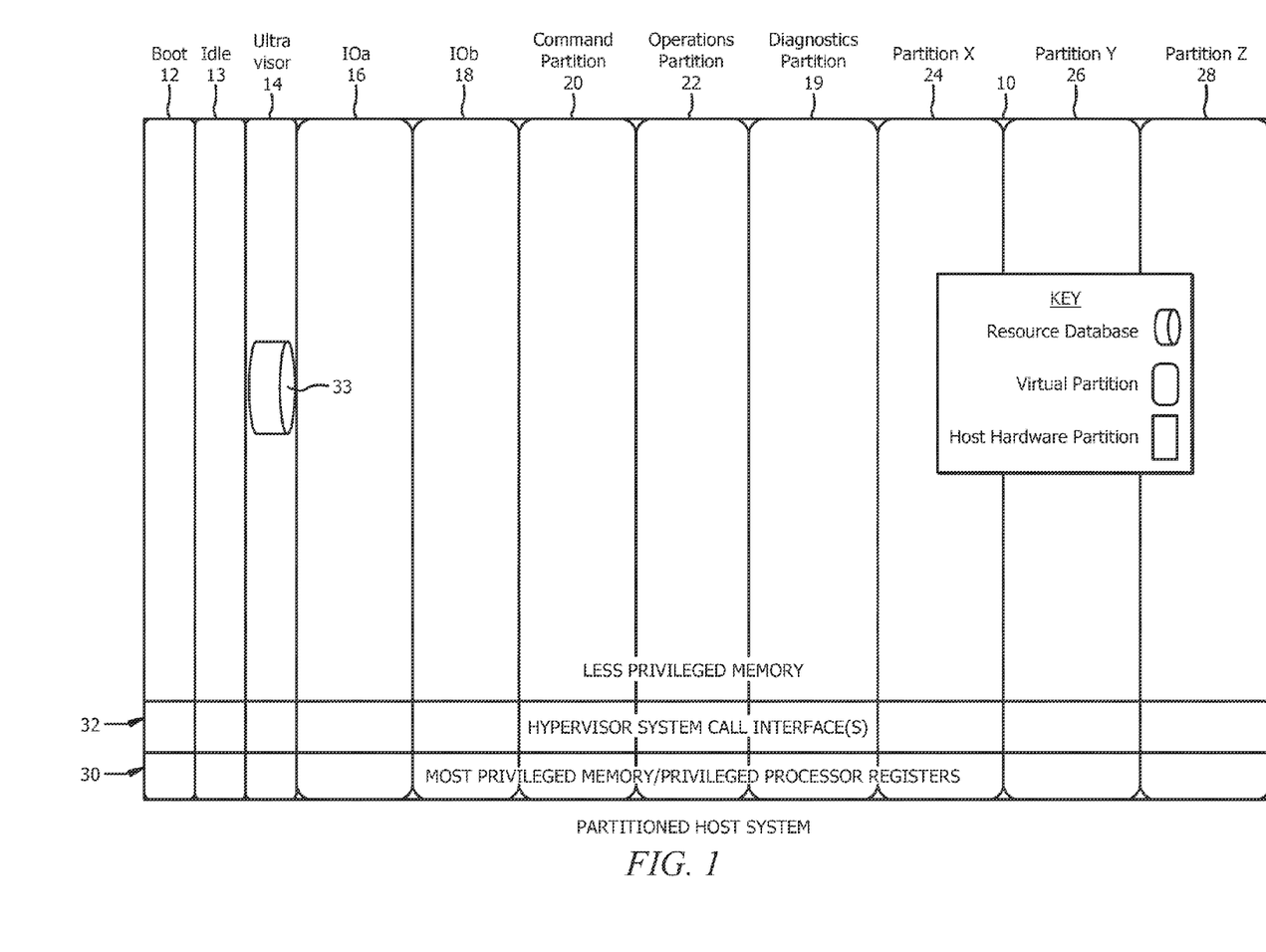
FIG. 1 is a schematic view of a host system partitioned using a para-virtualization system, illustrating system infrastructure partitions, according to an embodiment.

FIG. 1 shows an example arrangement of a para-virtualization system that can be used to accomplish the features described herein. In some embodiments, the architecture discussed herein uses the principle of least privilege to run code at the lowest practical privilege. To do this, special infrastructure partitions run resource management and physical I/O device drivers. FIG. 1 illustrates system infrastructure partitions on the left and user guest partitions on the right. Host hardware resource management runs as an ultravisor application in a special ultravisor partition. This ultravisor application implements a server for a command channel to accept transactional requests for assignment of resources to partitions. The ultravisor application maintains the master in-memory database of the hardware resource allocations. The ultravisor application also provides a read only view of individual partitions to the associated partition monitors.

In FIG. 1, a partitioned host (hardware) system (or node) 10 has lesser privileged memory that is divided into distinct partitions, including special infrastructure partitions, such as a boot partition 12, an idle partition 13, a resource management "ultravisor" partition 14, a first input/output (I/O) virtual machine (IOVM) partition 16, a second IOVM partition 18, a command partition 20, an operations partition 22, and a diagnostics partition 19, as well as virtual guest partitions (e.g., a virtual guest partition X 24, a virtual guest partition Y 26, and a virtual guest partition Z 28). As illustrated, the partitions 12-28 do not access the underlying privileged memory and processor registers 30 directly, but instead access the privileged memory and processor registers 30 via a hypervisor system call interface 32 that provides context switches among the partitions 12-28, e.g., in a conventional manner. However, unlike conventional virtual machine monitors (VMMs) and hypervisors, the resource management functions of the partitioned host system 10 of FIG. 1 are implemented in the special infrastructure partitions 12-22.

Furthermore, rather than requiring the re-write of portions of the guest operating system, drivers can be provided in the guest operating system environments that can execute system calls. As explained in further detail in U.S. Pat. No. 7,984,104, assigned to Unisys Corporation of Blue Bell, Pa., these special infrastructure partitions 12-22 control resource management and physical I/O device drivers that are, in turn, used by operating systems operating as guests in the virtual guest partitions 24-28. Of course, many other virtual guest partitions may be implemented in a particular partitioned host system 10 in accordance with the techniques of the present disclosure.

A boot partition 12 contains the host boot firmware and functions to initially load the ultravisor partition 14, the IOWA partitions 16 and 18, and the command partition 20. Once launched, the ultravisor partition 14 includes minimal firmware that tracks resource usage using a tracking application referred to herein as an ultravisor or resource management application. Host resource management decisions are performed in the command partition 20, and distributed decisions among partitions in the host partitioned system 10 are managed by the operations partition 22. The diagnostics partition 19 is responsible for handling diagnostics logs and dumps.

The I/O to disk drive operations and similar I/O operations are controlled by one or both of the IOVM partitions 16 and 18 to provide both failover and load balancing capabilities. Operating systems in the virtual guest partitions 24, 26, and 28 communicate with the IOVM partitions 16 and 18 via memory channels (FIG. 3) established by the ultravisor partition 14. The partitions communicate only via the memory channels. Hardware I/O resources are allocated only to the IOVM partitions 16 and 18. In the configuration of FIG. 1, the hypervisor system call interface 32 functions as a context switching and containment element (monitor) for the respective partitions.

Figure 2:
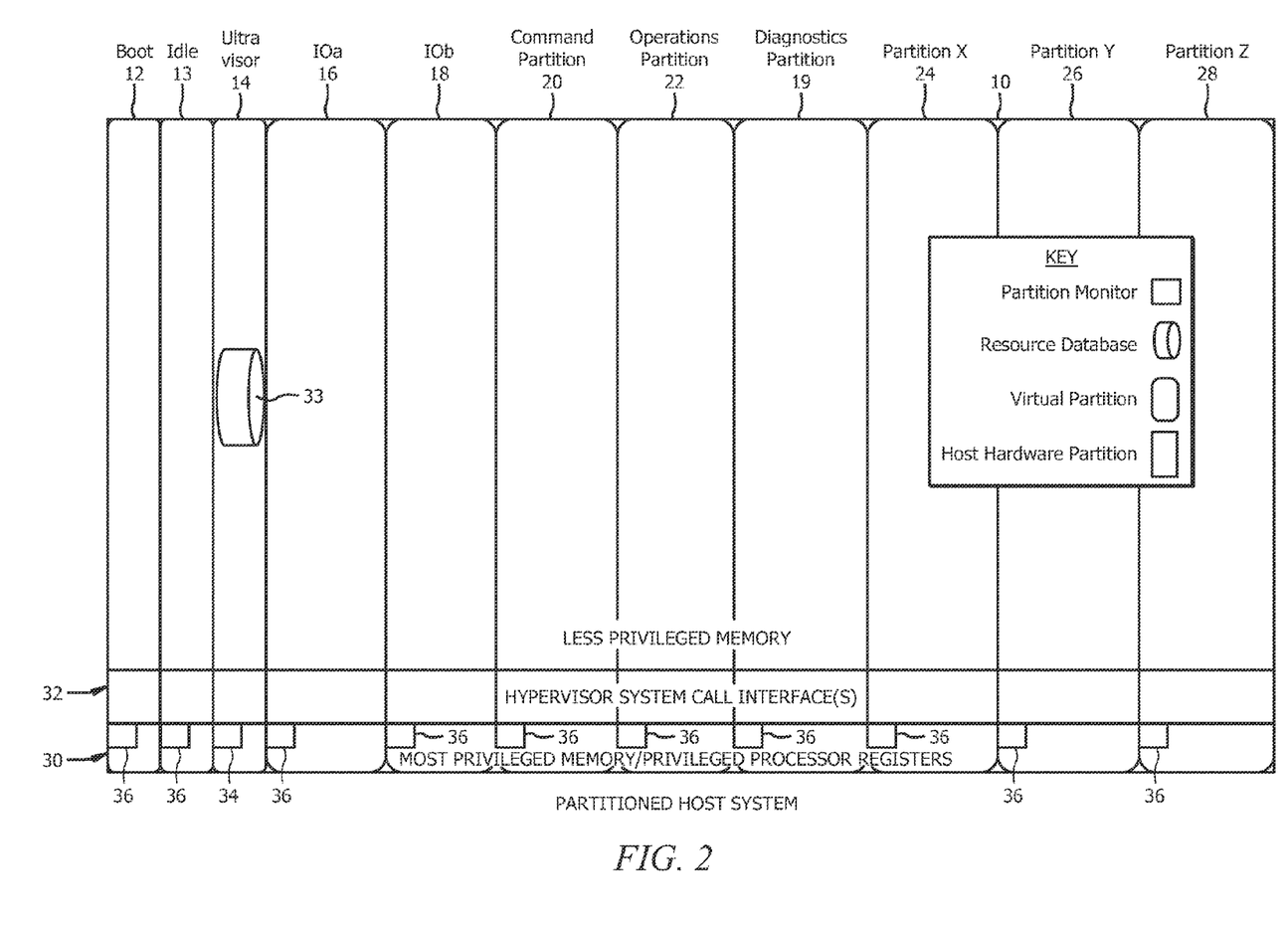
FIG. 2 is a schematic view of the host system of FIG. 1, illustrating the partitioned host system of FIG. 1 and the associated partition monitors of each partition, according to an embodiment.
Figure 3:
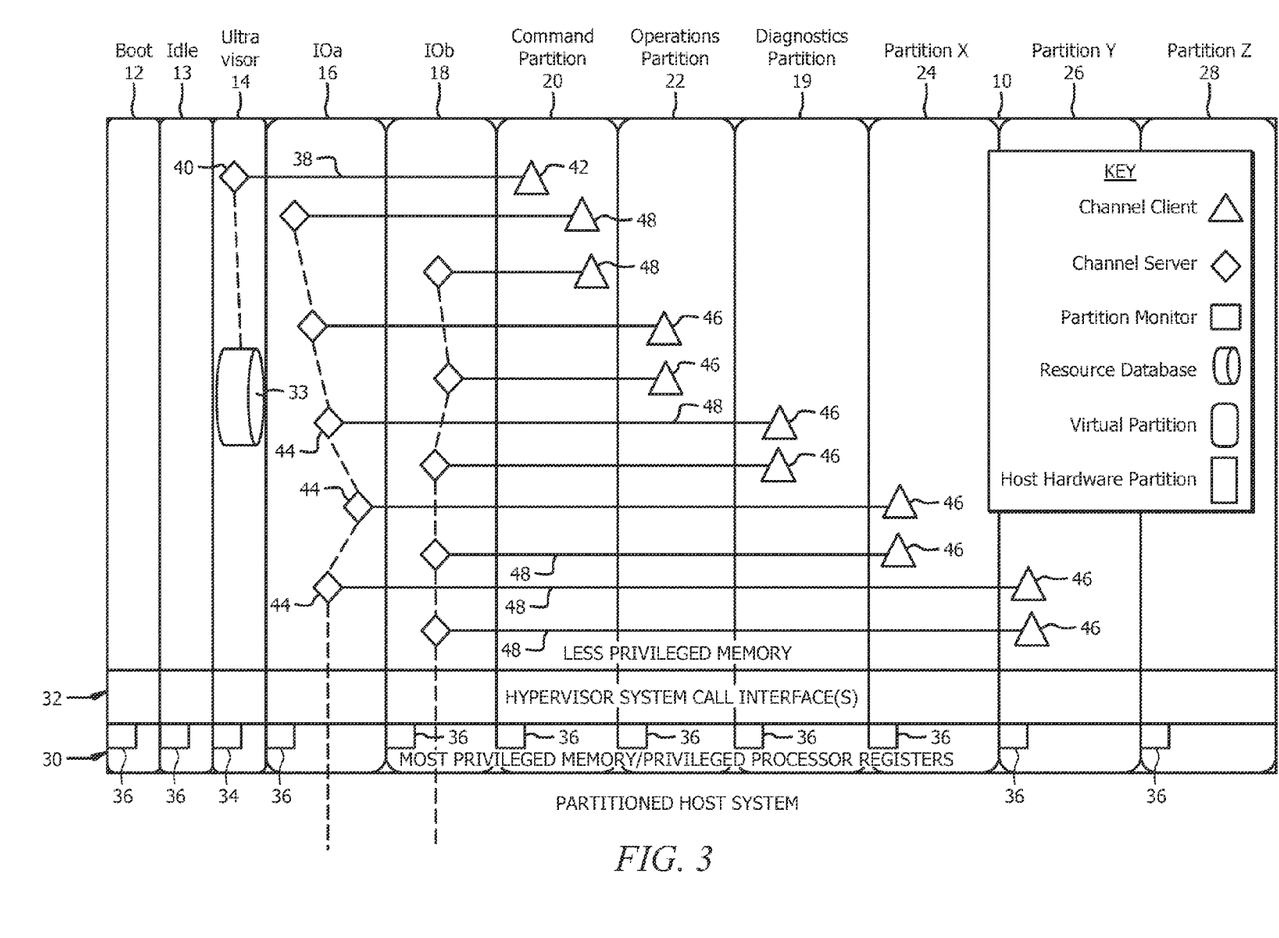
FIG. 3 is a schematic view of the host system of FIG. 1, illustrating memory mapped communication channels amongst various partitions of the para-virtualization system of FIG. 1, according to an embodiment.

The resource manager application of the ultravisor partition 14, shown as application 40 in FIG. 3, manages a resource database 33 that keeps track of the assignment of resources to partitions, and further serves a command channel 38 to accept transactional requests for assignment of the resources to respective partitions. As illustrated in FIG. 2, the ultravisor partition 14 also includes a partition (lead) monitor 34 that is similar to a virtual machine monitor (VMM), except that the partition monitor 34 provides individual read-only views of the resource database 33 in the ultravisor partition 14 to associated partition monitors 36 of each partition. Thus, unlike conventional VMMs, each partition has its own monitor instance 36 such that failure of the monitor 36 does not bring down the entire host partitioned system 10.

As will be explained below, the guest operating systems in the respective virtual guest partitions 24, 26, 28 can be modified to access the associated partition monitors 36 that implement together with the hypervisor system call interface 32 a communications mechanism through which the ultravisor partition 14, the IOVM partitions 16 and 18, and any other special infrastructure partitions may initiate communications with each other and with the respective virtual guest partitions. However, to implement this functionality, those skilled in the art will appreciate that the guest operating systems in the virtual guest partitions 24, 26, 28 can be modified so that the guest operating systems do not attempt to use the "broken" instructions in the x86 system that complete virtualization systems must resolve by inserting traps.

Basically, the approximately 17 "sensitive" IA32 instructions (those that are not privileged but that yield information about the privilege level or other information about actual hardware usage that differs from that expected by a guest OS) are defined as "undefined," and any attempt to run an unaware OS at other than ring zero likely will cause the OS to fail but will not jeopardize other partitions. Such "para-virtualization" requires modification of a relatively few lines of operating system code while significantly increasing system security by removing many opportunities for hacking into the kernel via the "broken" ("sensitive") instructions. Those skilled in the art will appreciate that the partition monitors 36 could instead implement a "scan and fix" operation whereby runtime intervention is used to provide an emulated value rather than the actual value by locating the sensitive instructions and inserting the appropriate interventions.

The partition monitors 36 in each partition constrain the guest OS and its applications to the assigned resources. Each monitor 36 implements a system call interface 32 that is used by the guest OS of its partition to request usage of allocated resources. The system call interface 32 includes protection exceptions that occur when the guest OS attempts to use privileged processor op-codes. Different partitions can use different monitors 36, which allows the support of multiple system call interfaces 32 and for these standards to evolve over time. Different partitions using different monitors 36 also allows the independent upgrade of monitor components in different partitions.

The monitor 36 preferably is aware of processor capabilities so that the monitor 36 may be optimized to use any available processor virtualization support. With appropriate monitor 36 and processor support, a guest OS in a virtual guest partition (e.g., virtual guest partitions 24-28) need not be aware of the ultravisor system of the invention and need not make any explicit "system" calls to the monitor 36. In this case, processor virtualization interrupts provide the necessary and sufficient system call interface 32. However, to improve performance, explicit calls from a guest OS to a monitor system call interface 32 still are desirable.

The monitor 36 also maintains a map of resources allocated to the partition it monitors, and ensures that the guest OS (and applications) in its partition use only the allocated hardware resources. The monitor 36 can do this because the monitor 36 is the first code running in the partition at the processor's most privileged level. The monitor 36 boots the partition firmware at a decreased privilege. The firmware subsequently boots the OS and applications. Normal processor protection mechanisms prevent the firmware, the OS, and the applications from obtaining the processor's most privileged protection level.

Unlike a conventional VMM, the monitor 36 has no I/O interfaces. All I/O operations are performed by I/O hardware mapped to the IOVM partitions 16 and 18, which use memory channels to communicate with their client partitions. Instead, the primary responsibility of the monitor 36 is to protect processor provided resources (e.g., processor privileged functions and memory management units). The monitor 36 also protects access to I/O hardware primarily through protection of memory mapped I/O operations. The monitor 36 further provides channel endpoint capabilities, which are the basis for I/O capabilities between virtual guest partitions.

The monitor 34 for the ultravisor partition 14 is a "lead" monitor with two special roles. First, the monitor 34 creates and destroys monitor instances 36. Second, the monitor 34 provides services to the created monitor instances 36 to aid processor context switches. During a processor context switch, the monitors 34 and monitor instances 36 save the virtual guest partition state in the virtual processor structure, save the privileged state in the virtual processor structure (e.g., IDTR, GDTR, LDTR, CR3), and then invoke the ultravisor monitor switch service. The ultravisor monitor switch service loads the privileged state of the target partition monitor (e.g., IDTR, GDTR, LDTR, CR3) and switches to the target partition monitor, which then restores the remainder of the virtual guest partition state.

The most privileged processor level (i.e., x86 ring 0) is retained by having the monitor instance 36 running below the system call interface 32. This retention is more effective if the processor implements at least three distinct protection levels (e.g., x86 ring 1, 2, and 3) available to the guest OS and applications. The ultravisor partition 14 connects to the monitors 34 and monitor instances 36 at the base (most privileged level) of each partition. The monitor 34 grants itself read only access to the partition descriptor in the ultravisor partition 14, and the ultravisor partition 14 has read only access to one page of the monitor state stored in the resource database 33.

Those skilled in the art will appreciate that the monitors 34 and monitor instances 36 of the invention are similar to a conventional VMM in that they constrain the partition to its assigned resources, the interrupt handlers provide protection exceptions that emulate privileged behaviors as necessary, and system call interfaces are implemented for "aware" contained system code. However, as explained in further detail below, the monitors 34 and monitor instances 36 of the invention are unlike a conventional VMM in that the master resource database 33 is contained in a virtual (ultravisor) partition for recoverability, the resource database 33 implements a simple transaction mechanism, and the virtualized system is constructed from a collection of cooperating monitors 34 and monitor instances 36 whereby a failure in one monitor 34 or monitor instance 36 need not doom all partitions (only containment failure that leaks out does). As such, as discussed below, failure of a single physical processing unit need not doom all partitions of a system, because partitions are affiliated with different processing units.

The monitors 34 and monitor instances 36 of the invention also are different from conventional VMMs in that each partition is contained by its assigned monitor, partitions with simpler containment requirements can use simpler and thus more reliable (and higher security) monitor implementations, and the monitor implementations for different partitions may, but need not be, shared. Also, unlike conventional VMMs, the lead monitor 34 provides access by other monitor instances 36 to the ultravisor partition resource database 33.

Partitions in the ultravisor environment include the available resources organized by the host node 10. A partition is a software construct (that may be partially hardware assisted) that allows a hardware system platform (or hardware partition) to be "partitioned" into independent operating environments. The degree of hardware assist is platform dependent but, by definition, is less than 100% (because, by definition, a 100% hardware assist provides hardware partitions). The hardware assist may be provided by the processor or other platform hardware features. From the perspective of the ultravisor partition 14, a hardware partition generally is indistinguishable from a commodity hardware platform without partitioning hardware.

Unused physical processors are assigned to a special "idle" partition 13. The idle partition 13 is the simplest partition that is assigned processor resources. The idle partition 13 contains a virtual processor for each available physical processor, and each virtual processor executes an idle loop that contains appropriate processor instructions to reduce processor power usage. The idle virtual processors may cede time at the next ultravisor time quantum interrupt, and the monitor 36 of the idle partition 13 may switch processor context to a virtual processor in a different partition. During host bootstrap, the boot processor of the boot partition 12 boots all of the other processors into the idle partition 13.

In some embodiments, multiple ultravisor partitions 14 also are possible for large host partitions, to avoid a single point of failure. Each ultravisor partition 14 would be responsible for resources of the appropriate portion of the host system 10. Resource service allocations would be partitioned in each portion of the host system 10. This allows clusters to run within a host system 10 (one cluster node in each zone), and still survive failure of an ultravisor partition 14.

As illustrated in FIGS. 1-3, each page of memory in an ultravisor enabled host system 10 is owned by one of its partitions. Additionally, each hardware I/O device is mapped to one of the designated IOVM partitions 16, 18. These IOVM partitions 16, 18 (typically two for redundancy) run special software that allows the IOVM partitions 16, 18 to run the I/O channel server applications for sharing the I/O hardware. Alternatively, for IOVM partitions executing using a processor implementing Intel's VT-d technology, devices can be assigned directly to non-IOVM partitions. Irrespective of the manner of association, such channel server applications include a virtual Ethernet switch (which provides channel server endpoints for network channels) and a virtual storage switch (which provides channel server endpoints for storage channels). Unused memory and I/O resources are owned by a special "available" pseudo partition (not shown in the figures). One such "available" pseudo partition per node of host system 10 owns all resources available for allocation.

Referring to FIG. 3, virtual channels are the mechanisms used in accordance with the invention to connect to zones and to provide relatively fast, safe, recoverable communications among the partitions. For example, virtual channels provide a mechanism for general I/O and special purpose client/server data communication between the virtual guest partitions 24, 26, 28 and the IOVM partitions 16, 18 in the same host 10. Each virtual channel provides a command and I/O queue (e.g., a page of shared memory) between two partitions. The memory for a channel is allocated and "owned" by the virtual guest partition 24, 26, 28. The ultravisor partition 14 maps the channel portion of client memory into the virtual memory space of the attached server partition. The ultravisor application tracks channels with active servers to protect memory during teardown of the owner virtual guest partition until after the server partition is disconnected from each channel. Virtual channels can be used for command, control, and boot mechanisms, as well as for traditional network and storage I/O.

As shown in FIG. 3, the ultravisor partition 14 has a channel server 40 that communicates with a channel client 42 of the command partition 20 to create the command channel 38. The IOWA partitions 16, 18 also include channel servers 44 for each of the virtual devices accessible by channel clients 46. Within each virtual guest partition 24, 26, 28, a channel bus driver enumerates the virtual devices, where each virtual device is a client of a virtual channel. The dotted lines in IOVMa partition 16 represent the interconnects of memory channels from the command partition 20 and operations partitions 22 to the virtual Ethernet switch in the IOVMa partition 16 that may also provide a physical connection to the appropriate network zone. The dotted lines in IOVMb partition 18 represent the interconnections to a virtual storage switch. Redundant connections to the virtual Ethernet switch and virtual storage switches are not shown in FIG. 3. A dotted line in the ultravisor partition 14 from the command channel server 40 to the transactional resource database 33 shows the command channel connection to the transactional resource database 33.

A firmware channel bus (not shown) enumerates virtual boot devices. A separate bus driver tailored to the operating system enumerates these boot devices, as well as runtime only devices. Except for the IOVM virtual partitions 16, 18, no PCI bus is present in the virtual partitions. This reduces complexity and increases the reliability of all other virtual partitions.

Virtual device drivers manage each virtual device. Virtual firmware implementations are provided for the boot devices, and operating system drivers are provided for runtime devices, Virtual device drivers also may be used to access shared memory devices and to create a shared memory interconnect between two or more virtual guest partitions. The device drivers convert device requests into channel commands appropriate for the virtual device type.

In the case of a multi-processor host 10, all memory channels 48 are served by other virtual partitions. This helps to reduce the size and complexity of the hypervisor system call interface 32. For example, a context switch is not required between the channel client 46 and the channel server 44 of the IOVM partition 16 because the virtual partition serving the channels typically is active on a dedicated physical processor.

Additional details regarding possible implementations of an ultravisor arrangement are discussed in U.S. Pat. No. 7,984,104, assigned to Unisys Corporation of Blue Bell, Pa., the disclosure of which is hereby incorporated by reference in its entirety.

According to a further embodiment, for enhanced security, an embedded version of the secure partitions and architecture described hereinabove (generally referred to as secure-partition, or s-Par) is described hereinbelow. As described hereinabove, the s-Par secure partition architecture includes a virtualization boot ("ultraboot") application and a number of service partitions. The ultraboot application, which is a Unified Extensible Firmware Interface (UEFI) application, is responsible for starting the secure partitions. The Unified Extensible Firmware Interface is an interface between an operating system and platform firmware.

Figure 4A:
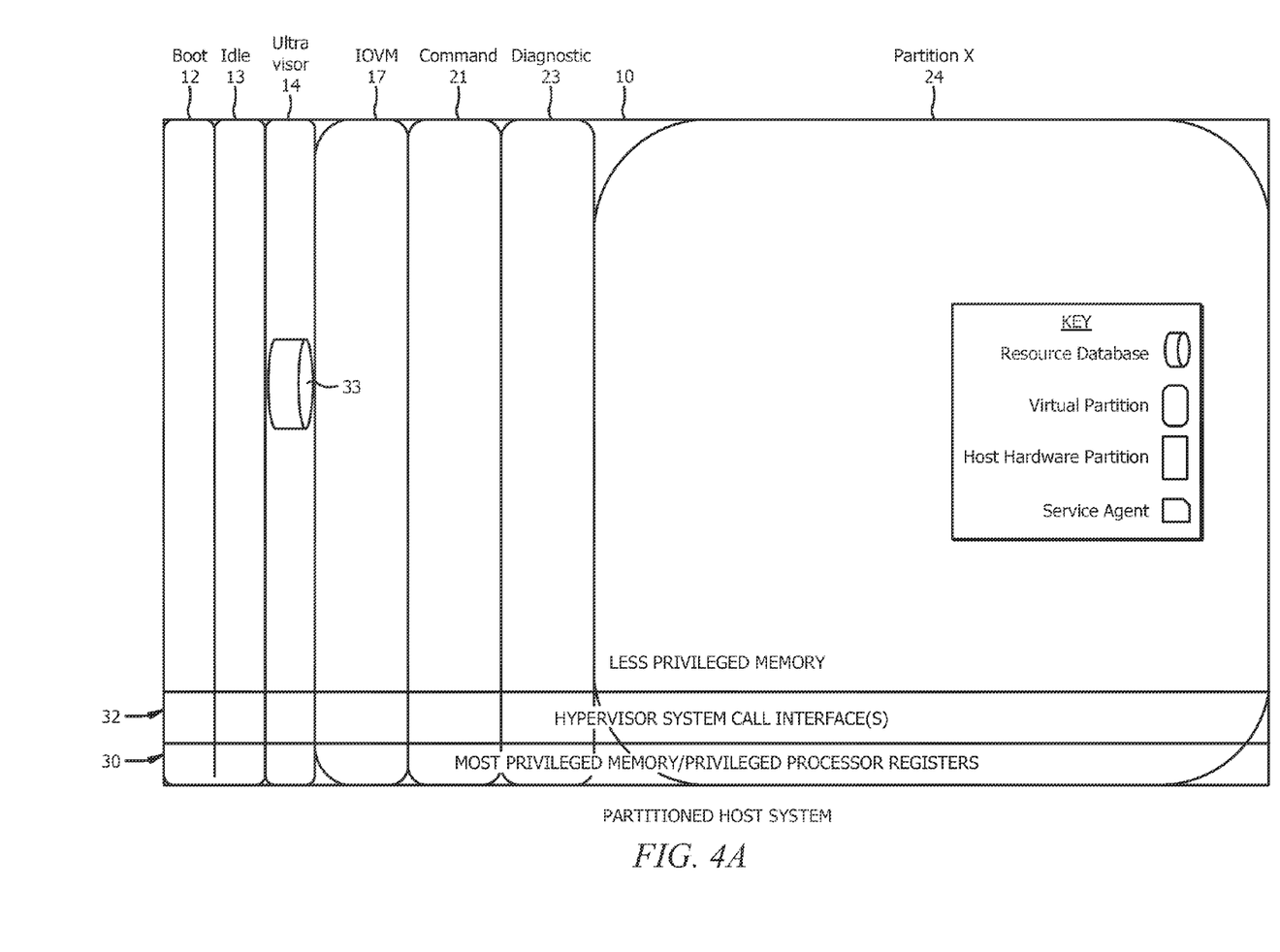
FIG. 4a is a schematic view of a host system partitioned using a reduced service partition configuration or architecture, according to an embodiment.

According to a further embodiment, the service partitions are reduced to only those partitions that are needed for basic operations, such as the command partition, the I/O partition(s), and a diagnostic partition. FIG. 4a is a schematic view of a host system 10 partitioned using such reduced service partition configuration or architecture, according to an embodiment. As shown, the host system 10 includes a boot partition 11 and a reduced number of service partitions, such as an IOVM partition 17, a command partition 21 and a diagnostic partition 23. The host system 10 can also include one or more guest partitions, such as the guest partition X 24.

Figure 4B:
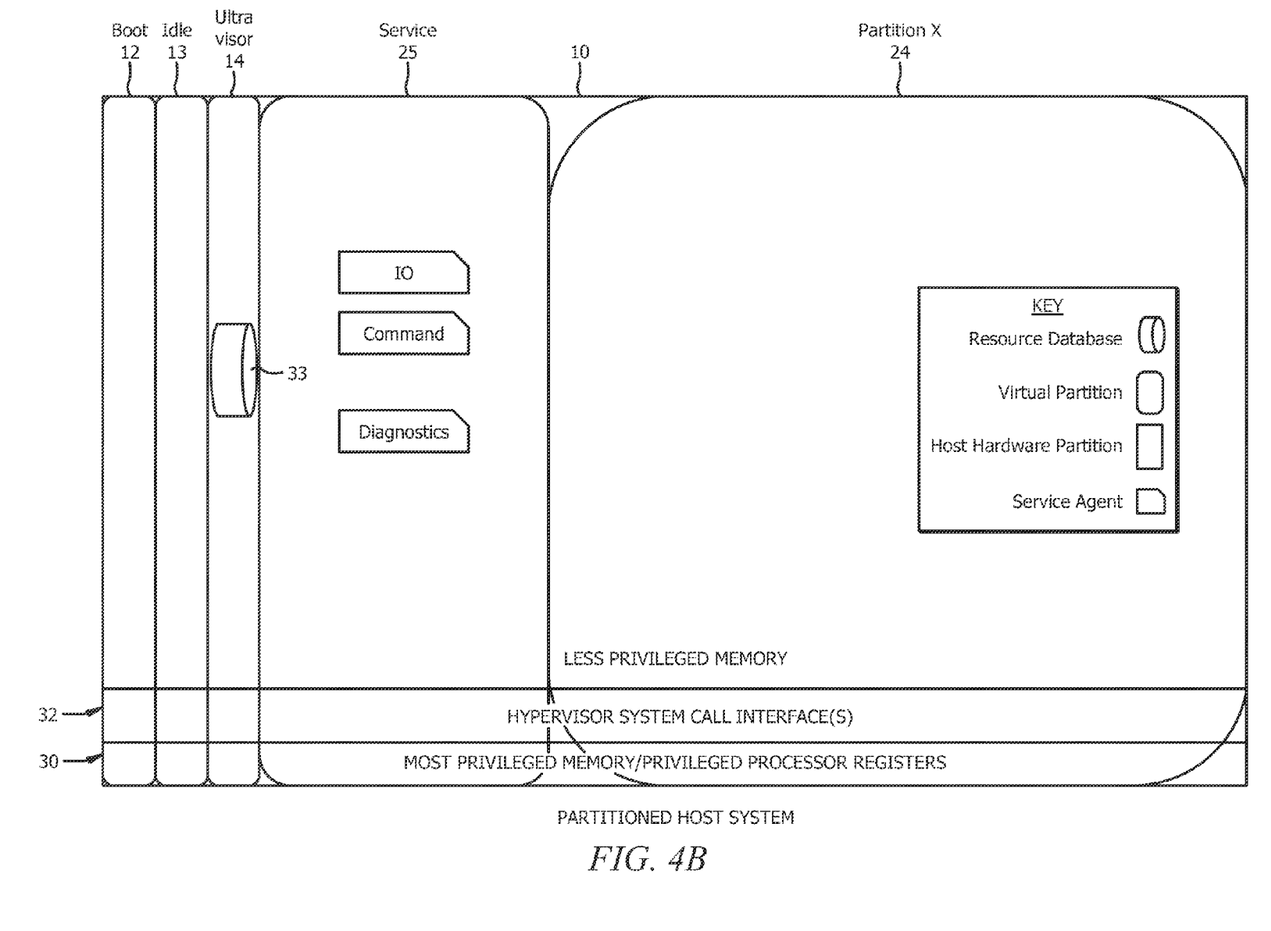
FIG. 4b is a schematic view of a host system partitioned using an alternative reduced service partition configuration or architecture, according to an embodiment.

Also, according to a further embodiment, the functionality of these reduced service partitions occupies or is moved into a single service partition. FIG. 4b is a schematic view of a host system 10 partitioned using an alternative reduced service partition configuration or architecture, in which the functionality of the reduced service partitions occupies or is moved into a single service partition 25.

The basic structure of this reduced service partition configuration or architecture (which can be referred to as s-Par Lite) involves a relatively small UEFI application (the ultraboot application) and a single service partition based on embedded Linux or other appropriate operating system.

One purpose of this reduced service partition architecture or configuration is to bring a relatively simplified and more accessible version of the secure partition architecture to computing devices and systems that meet the appropriate requirements needed to support and operate the secure partition architecture. The reduced service partition architecture generally can be considered virtualization for the sake of security, as well as convenience. The reduced service partition architecture allows for a downloadable version of the secure partition architecture that is booted directly from the UEFI firmware of the computing device or system.

Also, because the reduced service partition architecture has a smaller footprint than a conventional secure partition architecture, the reduced service partition architecture can be loaded directly from the flash memory of a computing device. Therefore, instead of the computing device booting the reduced service partition architecture (as with a conventional secure partition architecture), the computing device actually contains the reduced service partition architecture as part of its firmware, and executes the reduced service partition architecture as part of the boot sequence of the computing device. Also, as will be discussed hereinbelow, the reduced service partition architecture can be stored on and loaded from a data storage disk or device of the computing device.

According to an embodiment, the reduced service partition architecture requires no separation between the computing device and the reduced service partition architecture. The reduced service partition architecture is embedded in the firmware of the computing device, and therefore makes the computing device appear to an end user as a set of resources that can be assigned to various operating systems. The reduced service partition architecture also allows for a relatively greater level of security, by using an UEFI secure boot to guarantee that the firmware of the computing device, and the reduced service partition architecture as one of its components, are not compromised.

In general, the reduced service partition architecture is an embedded version of the secure partition architecture. The secure partition architecture and design facilitates the ability to implement the reduced service partition architecture. As discussed hereinabove, the core mission of the secure partition architecture is to create and maintain isolated secure partitions. Isolated secure partitions are achieved by providing a Trusted Computing Base (TCB). The TCB contains all of the elements of the system responsible for supporting the security policy and supporting the isolation of objects (code and data) on which the protection is based. The TCB can be divided into two basic categories, based on whether the TCB executes in root mode or executes in non-root mode.

There are two code components that execute in VT-x root mode. The monitor component, which includes VMM handlers, is associated with a dedicated secure partition. The context switch component is associated with a (physical) logical processor.

The monitor assists the VT-x hardware in enforcing the isolation policy. The VMM handlers provide minimal emulation of "legacy" traditional computing device architecture, e.g., advanced programmable interrupt controller (APIC), input/output APIC (IOAPIC), peripheral interface controller (PIC), real-time controller (RTC), programmable interval timer (PIT), advanced configuration and power interface (ACPI) fixed registers, and the COM2 debug output port.

The context switch and VT-x boot (VMXON) for logical-processors (logical processor cores) enables the sharing of logical processors by the secure partition architecture service partitions. The context switch component also enables a control service to perform housekeeping (create/start/halt) of virtual processors in the context of the logical-processor. The context switch component also enables Intel HLT op-code to put unassigned or inactive logical-processors into an ACPI C1 suspended state.

With respect to the TCB executing in a non-root mode, there are several non-root mode code system elements. The ultravisor services are implementations, e.g., C language implementations, which rely only on shared memory. The control service maintains the isolation policy (e.g., processor cores, memory segments/sections, DIRECT devices). The idle service provides for a secure scrub of physical memory devices. The logger and diagnostic service provides secure diagnostic logs for TCB, service and virtual guest components. The ACPI service, which is not a core part of the TCB, provides access to securely enumerate PCY I/O devices (and eventually the host ACPICA AML interpreter).

According to an embodiment, the entire reduced service partition TCB is loaded and booted via the UEFI driver, ultraboot.efi. In this manner, the reduced service partition architecture is placed in the UEFI firmware of the computing device and execution is started from the moment the UEFI firmware loads the driver.

According to a further embodiment, using the s-Par service partition architecture or the s-Par Lite reduced service partition architecture, one or more secure or isolated applications are executed without the need for any specific operating system. The isolated applications also can be executed using a forward fabric architecture, which allows applications and/or services to run across multiple operating systems instantiations that may exist within single or multiple platforms. A secure or isolated application is built using the s-Par service partition, the s-Par Lite reduced service partition, or a forward fabric architecture, and the secure or isolated application is executed within its own isolated secure partition. Alternatively, the secure or isolated application shares its partition only with other secure applications that are allowed to be executed along with the primary secure application.

Figure 5:
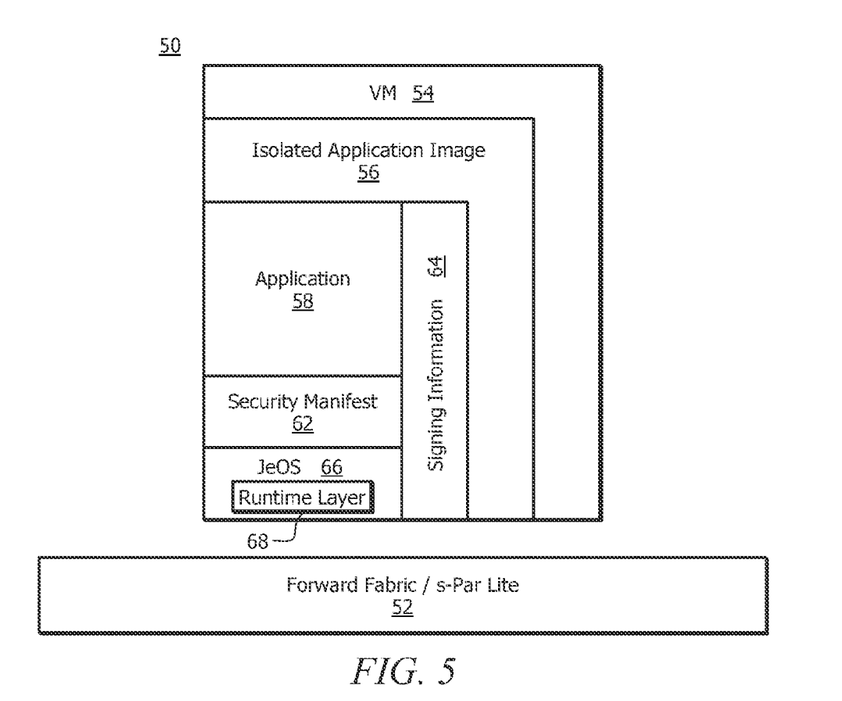
FIG. 5 is a schematic view of a secure execution environment for a secure or isolated application, according to an embodiment.

FIG. 5 is a schematic view of a secure execution environment 50 for a secure or isolated application, according to an embodiment. The secure execution environment 50 includes an isolated, forward fabric or reduced service (s-Par Lite) environment 52. However, it should be understood that the environment 52 can be an isolated s-Par service environment. The isolated environment 52 includes a virtual machine (VM) partition 54 and an isolated application image 56.

The isolated application image 56 includes a first or primary secure or isolated application (code to execute) 58, a security manifest layer or portion 62, and a signing properties or information portion 64. The isolated application image 56 also includes a secure application operating system (OS) layer or portion (such as a JeOS—Just Enough Operating System) 66, which includes a secure application runtime layer or portion 68. Although the JeOS portion 66 is shown as part of the isolated application image 56, the JeOS portion 66 typically is added to the isolated application image 56 by the forward fabric or reduced service (s-Par Lite) environment 52. The JeOS portion 66 typically resides on a read-only memory (ROM) disk that is assigned to the virtual machine (VM) partition 54 at start-up.

The secure execution environment 50 is one type of isolated application environment, according to an embodiment. In the secure execution environment 50, the secure or isolated application 58 can run only by itself. In another type of secure execution environment, as will be described in greater detail hereinbelow, a secure or isolated application can run with some other secure or isolated application.

The secure execution environment 50 is controlled by the security manifest portion 62. The security manifest portion 62 of the secure or isolated application 58 specifies the type of secure or isolated application 58. Also, in the case where the secure or isolated application 58 shares the virtual machine (VM) partition 54, the security manifest portion 62 specifies the application identification (ID) that can share the virtual machine (VM) partition 54 with the secure or isolated application 58.

The security manifest portion 62 also provides information about the isolation and sandboxing of the secure or isolated application 58. Sandboxing, also known as containerization, is an approach that limits or contains the environment in which certain applications can execute. The security manifest portion 62 provides control over whether more than one secure or isolated applications can execute together in the same partition, or whether the secure or isolated applications need separate partitions. The security manifest portion 62 also enforces what specific hardware and software resources the secure or isolated application 58 can access.

According to an embodiment, the secure execution environment 50 provides additional isolation and at a greater level for the secure or isolated application 58 than conventional sandboxing. While conventional sandboxing can provide isolation between applications within an operating system, the secure execution environment 50 provides isolation security for the secure or isolated application 58 at a greater level by the secure or isolated application 58 executing in its own guest or service partition.

According to an embodiment, in addition to providing full isolation for the secure or isolated application 58, the developer of the secure or isolated application 58 must own the developer certificate provided by the partition manufacturer to sign the secure or isolated application 58 and to prove that the secure or isolated application 58 is authentic and comes from the trusted source. No one without the official certificate is able to start the secure or isolated application 58 on the isolated environment 52.

According to an embodiment, the secure or isolated application 58 is executed without any standard operating system (OS). Instead, the secure or isolated application 58 makes use of the JeOS. JeOS refers to a customized operating system that fits the needs of a particular application, e.g., the secure or isolated application 58, A JeOS operating system is an operating system that includes only the portions of an operating system required to support a particular application.

In this manner, the secure application operating system (OS) layer or portion 66 is a JeOS that includes only the operating system portions needed to support the secure or isolated application 58. The secure application operating system (OS) layer or portion 66 also provides the basic input/output (I/O) functionality and process scheduling needed to execute the secure or isolated application 58.

According to an embodiment, the secure or isolated application 58 runs on top of the JeOS, which provides the application programming interfaces (APIs) for the software developer. The software developer is able to create an application to run in this environment using standard development tools and compilers.

Once the developer has the program and security manifest ready, the developer signs the secure or isolated application 58 with (i) the unique developer certificate issued by the partition manufacturer, (ii) the unique isolated application identification (ID), and (iii) the universally unique identifier (QUID) of the isolated environment 52, This signing is required for creating a valid isolated application image 56 that will be recognized by the isolated environment 52.

According to an embodiment, the isolated environment 52 supports secure or isolated applications 58 by verifying the authenticity of the signed image and allowing this image to run only on the environments for which they were signed. The installation of the secure or isolated application 58 is performed by the user.

The secure application runtime layer or portion 68 provides the runtime needed to execute the secure or isolated application 58. As discussed hereinabove, secure application runtime layer or portion 68 is part of the secure application operating system layer or portion 66.

Figure 6:
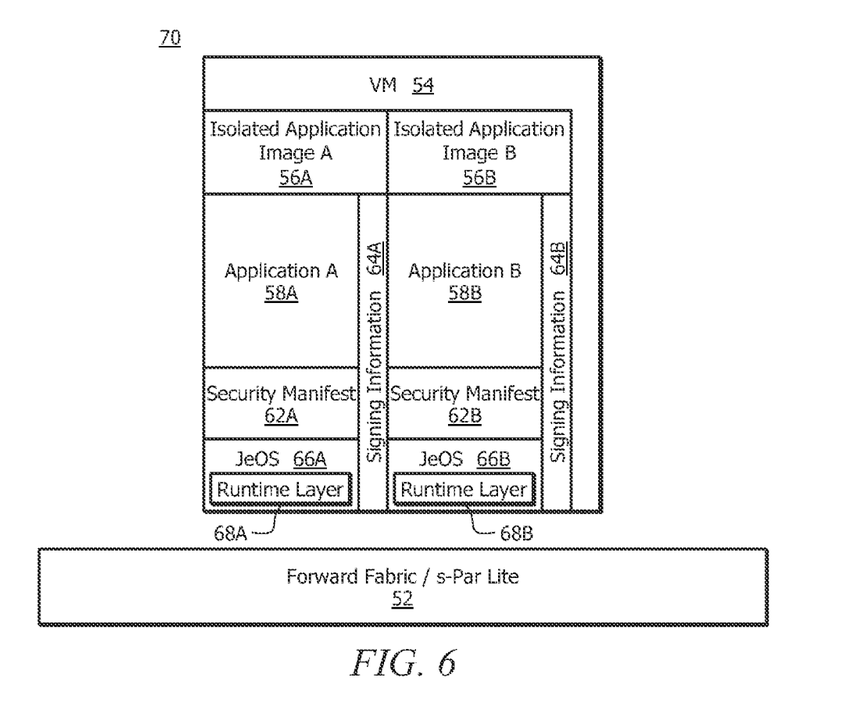
FIG. 6 is a schematic view of a secure execution environment for a plurality of secure applications, according to an embodiment.

FIG. 6 is a schematic view of a secure execution environment 70 for a plurality of secure or isolated applications, according to an embodiment. The secure execution environment 70 includes the isolated, forward fabric or reduced service (s-Par Lite) environment 52. However, it should be understood that the environment 52 can be an isolated s-Par service environment. The isolated environment 52 includes the virtual machine (VM) partition 54 and isolated application images 56A and 56B for the first or primary isolated or secure application 58A and the second isolated or secure application 58B, respectively.

Each isolated application image 56A, 56B includes a secure or isolated application (code to execute) 58A, 58B, a security manifest layer or portion 62A, 62B, and a signing properties or information portion 64A, 64B. Each isolated application image 56A, 56B also includes a secure application operating system (OS) layer or portion (e.g., a JeOS) 66A, 66B. Each JeOS 66A, 66B includes a secure application runtime layer or portion 68A, 68B.

As discussed hereinabove, the secure execution environment 70 is the type of secure execution environment in which a secure or isolated application (e.g., the first or primary secure or isolated application 58A) can run with some other secure or isolated applications (e.g., the second secure or isolated application 58B). However, according to an embodiment, the first or primary isolated or secure application 58A can be run only with other isolated or secure applications that are allowed to be executed therewith in the secure execution environment 70.

Figure 7:
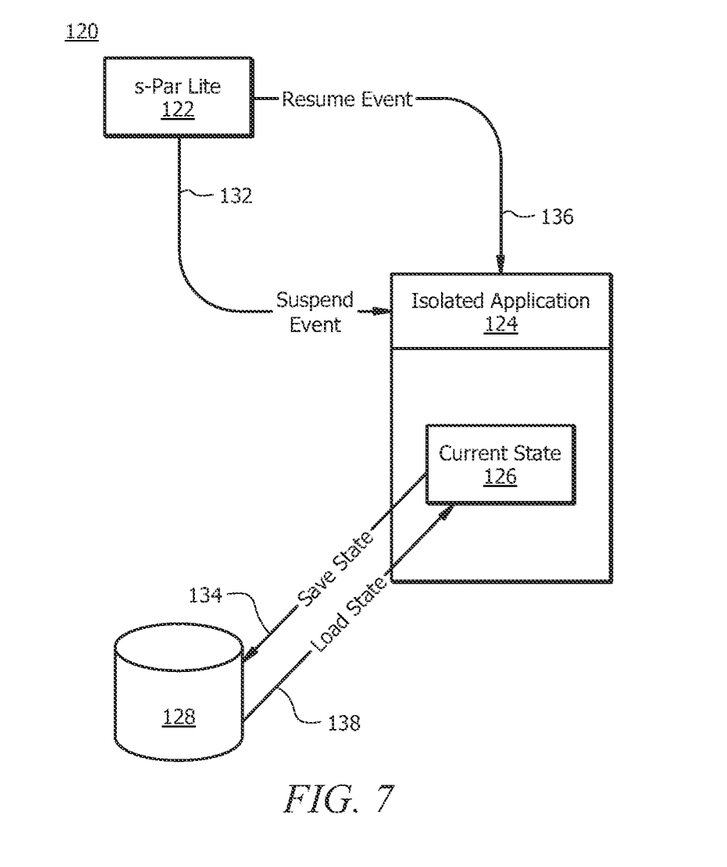
FIG. 7 is a schematic view of a host system partitioned using a reduced service partition architecture and having a secure or isolated application, showing execution relationships and transferability, according to an embodiment.

FIG. 7 is a schematic view of a host system 120 partitioned using a reduced service partition architecture and having a secure or isolated application, showing execution relationships and transferability, according to an embodiment. The host system 120 includes a reduced service partition (s-Par Lite) configuration 122 (or other appropriate partition configuration), a secure or isolated application 124 having a current or persistent state 126, and a physical storage device 128.

The reduced service partition (s-Par Lite) configuration 122 commands that each secure or isolated application 124 be able to save its current or persistent execution state 126 when requested by the reduced service partition (s-Par Lite) configuration 122. Therefore, when the reduced service partition (s-Par Lite) configuration 122 sends a suspend event instruction 132 to the secure or isolated application 124, the secure or isolated application 124 saves the current execution state of the secure or isolated application 124 to the physical storage device 128 (shown as a save state function or activity 134). Also, when the reduced service partition (s-Par Lite) configuration 122 sends a resume event instruction 136 to the secure or isolated application 124, the secure or isolated application 124 loads the previously-saved current execution state from the physical storage device 128 (shown as a load state function or activity 138).

In this manner, each secure or isolated application 124 can be shut down or suspended, and then restarted or resumed directly from the last point of execution, without losing any execution progress.

Also, according to an embodiment, each secure or isolated application 124 can be transferred between different platforms and devices.

Figure 8:
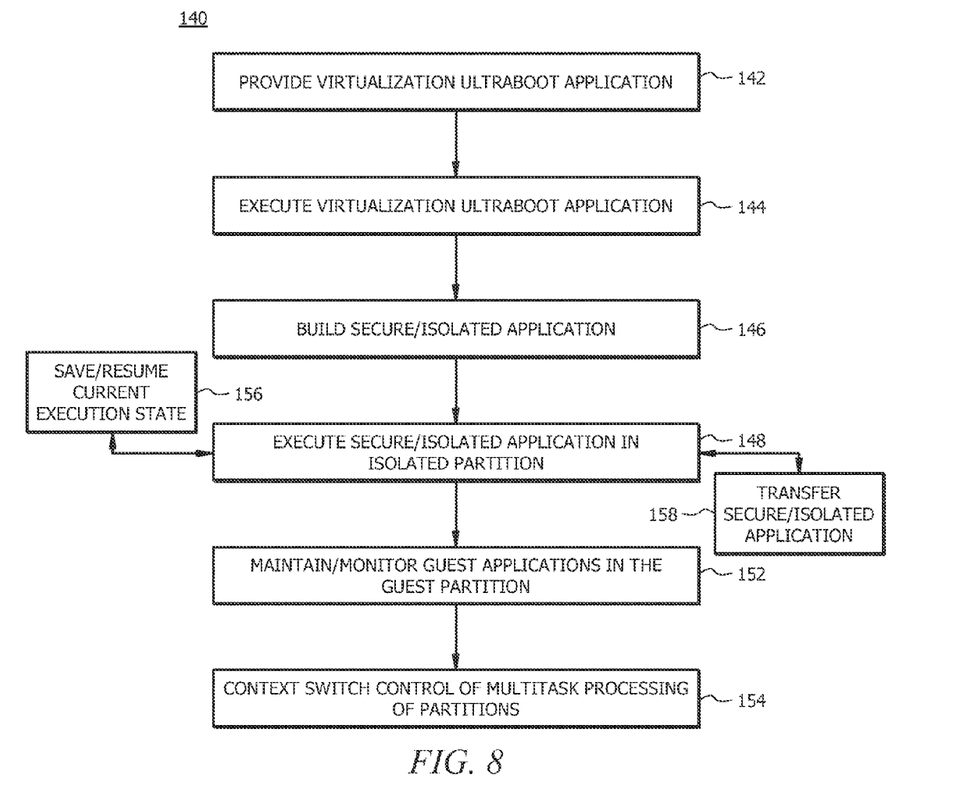
FIG. 8 is a flow diagram of a virtualization method for a secure execution environment host system, using a service partition configuration or architecture having a secure application, according to an embodiment.

FIG. 8 is a flow diagram of a virtualization method 140 for a secure execution environment host system, using a service partition configuration or architecture having a secure application, according to an embodiment. The method 140 includes providing a virtualization ultraboot application (shown as 142). As discussed hereinabove, the virtualization ultraboot application is a UEFI application that is part of the firmware of the computing device.

The method 140 also includes executing the virtualization ultraboot application (shown as 144). As discussed hereinabove, the virtualization ultraboot application is responsible for bootstrapping the secure partition tool, including the reduced service partition configuration or architecture. The virtualization ultraboot application divides the hosting computing device into at least one virtual service partition (and at least one virtual guest partition).

The method 140 also includes building a secure or isolated application (shown as 146). As discussed hereinabove, the secure or isolated application is built using either the s-Par service partition architecture, the s-Par Lite reduced service partition architecture, or the forward fabric architecture.

The method 140 also includes executing the secure or isolated application in the isolated secure partition (shown as 148). As discussed hereinabove, the secure or isolated application is executed within its own isolated secure partition. Alternatively, the secure or isolated application shares its partition only with other secure or isolated applications that are alloy fed to be executed along with the primary secure or isolated application.

As discussed hereinabove, the isolated secure partition includes a security manifest portion for controlling the execution of the secure or isolated application within the isolated secure partition. The isolated secure partition also includes a secure or isolated application runtime portion that provides the runtime needed to execute the secure or isolated application within the isolated secure partition. Also, the secure or isolated application is executed with a secure or isolated application operating system (OS) portion that supports only the execution of the secure or isolated application within the isolated secure partition. As discussed hereinabove, the secure or isolated application is executed within the isolated secure partition without the need for any standard operating system (OS).

The method 140 also includes maintaining guest applications in the virtual guest partition(s) (shown as 152), As discussed hereinabove, a monitor that operates in the most privileged system memory maintains guest applications in the virtual guest partition(s).

The method 140 also includes controlling multitask processing in the partitions (shown as 154). As discussed hereinabove, a context switch between the monitor and the virtual guest partitions controls the multitask processing in the partitions of the computing device.

The method 140 also can include saving/resuming the current execution state of the secure or isolated application (shown as 156). As discussed hereinabove, the current execution state of the secure or isolated application can be shut down or suspended, and saved to a physical storage device. Also, the previously-saved current execution state of the secure or isolated application can be loaded from the physical storage device, and then restarted or resumed directly from the last point of execution, without losing any execution progress.

The method 140 also can include transferring the secure or isolated application (shown as 158). As discussed hereinabove, each secure or isolated application can be transferred between different platforms and devices.

One of ordinary skill in the art will appreciate that any process or method descriptions herein may represent modules, segments, logic or portions of code which include one or more executable instructions for implementing logical functions or steps in the process. It should be further appreciated that any logical functions may be executed out of order from that described, including substantially concurrently or in reverse order, depending on the functionality involved, as would be understood by those reasonably skilled in the art. Furthermore, the modules may be embodied in any non-transitory computer readable medium for use by or in connection with an instruction execution system, apparatus, or device, such as a computer-based system, processor-containing system, or other system that can fetch the instructions from the instruction execution system, apparatus, or device and execute the instructions.

It will be apparent to those skilled in the art that many changes and substitutions can be made to the embodiments described herein without departing from the spirit and scope of the disclosure as defined by the appended claims and their full scope of equivalents.

The invention claimed is:

1. A virtualization method for a host computing device having at least one host processor and system resources including memory divided into most privileged system memory and less privileged user memory, the method comprising:
providing an ultraboot application that operates in the less privileged user memory and divides the host computing device into a resource management partition, at least one virtual service partition and at least one virtual guest partition,
executing the ultraboot application to divide the host computing device into the resource management partition, the at least one virtual guest partition providing a virtualization environment for at least one guest operating system, the at least one virtual service partition providing a virtualization environment for the basic operations of the virtualization system, and the resource management partition maintaining a resource database for use in managing the use of the at least one host processor and the system resources;
building a secure application;
executing the secure application in the at least one virtual guest partition, wherein the at least one virtual guest partition is an isolated secure partition, wherein the isolated secure partition includes a security manifest portion for controlling the execution of the secure application within the isolated secure partition, wherein the isolated secure partition includes a secure application operating system (OS) portion that supports only the execution of the secure application within the isolated secure partition, wherein the secure application operating system (OS) portion includes a secure application runtime portion that provides the runtime needed to execute the secure application within the isolated secure partition;

maintaining, by a monitor in the most privileged system memory, guest applications in the at least one virtual guest partition within memory space allocated by the at least one virtual service partition to the at least one virtual guest partition; and controlling multitask processing in the partitions on the at least one host processor by a context switch between the at least one monitor and the respective virtual guest partitions and the at least one virtual service partition, wherein the at least one virtual service partition further comprises a plurality of isolated secure partitions isolated from one another, wherein at least one of the isolated secure partitions includes a secure application executing therein and isolated from the other isolated secure partitions, and wherein at least one of the isolated secure partitions includes a primary secure application executing therein and sharing the isolated secure partition with at least one other secure application that is allowed to be executed with the primary secure application within the isolated secure partition.

2. The method as recited in claim 1, wherein the secure application further comprises a primary secure application, and wherein the primary secure application shares the isolated secure partition with at least one other secure application that is allowed to be executed with the primary secure application within the isolated secure partition.

3. The method as recited in claim 1, wherein the security manifest portion controls the sharing of the isolated secure partition by the primary secure application with the at least one secure application.

4. The method as recited in claim 1, wherein the security manifest portion controls what hardware and software resources the secure application can access within the isolated secure partition.

5. The method as recited in claim 1, wherein the secure application operating system (OS) portion is a Just Enough Operating System (JeOS) that includes only the portions of an operating system required to support the secure application being executed in the isolated secure partition.

6. The method as recited in claim 1, wherein the secure application operating system (OS) portion provides input/output (I/O) functionality and process scheduling needed to execute the secure application within the isolated secure partition.

7. The method as recited in claim 1, wherein the secure application is executed in the isolated secure partition using an s-Par service partition (s-Par) architecture.

8. The method as recited in claim 1, wherein the secure application is executed in the isolated secure partition using a reduced s-Par service partition (s-Par Lite) architecture.

9. The method as recited in claim 1, wherein the secure application is configured to be able to save its current execution state to a physical data storage device coupled to the isolated secure partition, and wherein the secure application is configured to be able resume its previously-saved current execution state without losing any execution progress.

10. The method as recited in claim 1, wherein the secure application is configured to be transferred to at least one platform or device within or coupled to the host computing system.

11. The method as recited in claim 1, further comprising loading the secure application to the isolated secure partition from a flash memory portion of the host computing device.

12. The method as recited in claim 1, wherein the ultraboot application is a Unified Extensible Firmware Interface (UEFI) application, and wherein the UEFI application operates to establish the security of the isolated secure partition and the security of the at least one virtual service partition.

13. The method as recited in claim 1, further comprising authenticating the secure application using a developer certificate.

14. A virtualization system for a host computing device having at least one host processor and system resources including memory divided into most privileged system memory and less privileged user memory, the system comprising:

an ultraboot application that is stored and operates in the less privileged user memory and divides the host computing device into a resource management partition, at least one virtual service partition and at least one virtual guest partition, the at least one virtual guest partition providing a virtualization environment for at least one guest operating system, the at least one virtual service partition providing a virtualization environment for the basic operations of the virtualization system, and the resource management partition maintaining a resource database for use in managing the use of the at least one host processor and the system resources;

wherein the at least one virtual service partition is an isolated secure partition having a secure application executing therein, wherein the isolated secure partition includes a security manifest portion for controlling the execution of the secure application within the isolated secure partition, wherein the isolated secure partition includes a secure application operating system (OS) portion that supports only the execution of the secure application within the isolated secure partition, wherein the secure application operating system (OS) portion includes a secure application runtime portion that provides the runtime needed to execute the secure application within the isolated secure partition;

at least one monitor that is stored and operates in the most privileged system memory and maintains guest applications in the at least one virtual guest partition within memory space allocated by the at least one virtual service partition to the at least one virtual guest partition; and a context switch between the at least one monitor and the respective virtual guest partitions and the at least one virtual service partition for controlling multitask processing in the partitions on the at least one host processor, wherein the at least one virtual service partition further comprises a plurality of isolated secure partitions isolated from one another, wherein at least one of the isolated secure partitions includes a secure application executing therein and isolated from the other isolated secure partitions, and wherein at least one of the isolated secure partitions includes a primary secure application executing therein and sharing the isolated secure partition with at least one other secure application that is allowed to be executed with the primary secure application within the isolated secure partition.

15. The system as recited in claim 14, wherein the secure application further comprises a primary secure application, and wherein the primary secure application shares the isolated secure partition with at least one other secure application that is allowed to be executed with the primary secure application within the isolated secure partition.

16. The system as recited in claim 15, wherein the security manifest portion controls the sharing of the isolated secure partition by the primary secure application with the at least one secure application.

17. The system as recited in claim 14, wherein the security manifest portion controls what hardware and software resources the secure application can access within the isolated secure partition.

18. The system as recited in claim 14, wherein the secure application operating system (OS) portion is a Just Enough Operating System (JeOS) that includes only the portions of an operating system required to support the secure application being executed in the isolated secure partition.

19. The system as recited in claim 14, wherein the secure application operating system (OS) portion provides input/output (I/O) functionality and process scheduling needed to execute the secure application within the isolated secure partition.

20. The system as recited in claim 14, wherein the secure application is executed in the isolated secure partition using an s-Par service partition (s-Par) architecture.

21. The system as recited in claim 14, wherein the secure application is executed in the isolated secure partition using a reduced s-Par service partition (s-Par Lite) architecture.

22. The system as recited in claim 14, wherein the secure application is configured to be able to save its current execution state to a physical data storage device coupled to the isolated secure partition, and wherein the secure application is configured to be able resume its previously-saved current execution state without losing any execution progress.

23. The system as recited in claim 14, wherein the secure application is configured to be transferred to at least one platform or device within or coupled to the host computing system.

24. The system as recited in claim 14, wherein the secure application is loaded to the isolated secure partition from a flash memory portion of the host computing device.

25. The system as recited in claim 14, wherein the ultraboot application is a Unified Extensible Firmware Interface (UEFI) application, and wherein the UEFI application operates to establish the security of the isolated secure partition and the security of the at least one virtual service partition.

26. The system as recited in claim 14, wherein the secure application is authenticated by a developer certificate.

\* \* \* \* \*